United States Patent [19]
Eastty

[11] Patent Number: 6,108,286
[45] Date of Patent: *Aug. 22, 2000

[54] METHOD AND APPARATUS FOR BUFFERING VARIABLE-RATE DATA

[75] Inventor: Peter Charles Eastty, Oxford, United Kingdom

[73] Assignee: Sony United Kingdom Limited, Weybridge, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,198

[22] Filed: Jan. 24, 1997

Related U.S. Application Data

[63] Continuation of application No. 08/433,707, May 2, 1995, abandoned.

[30] Foreign Application Priority Data

May 4, 1994 [GB] United Kingdom .................... 9408849

[51] Int. Cl.[7] ................ G11B 5/09; G11B 3/90; G11B 27/36; G11B 15/46
[52] U.S. Cl. ................ 369/48; 369/53; 369/54; 369/58; 360/73.02
[58] Field of Search ................ 360/32, 40, 46, 360/48, 51, 73.03, 73.02; 369/47, 48, 50, 54, 60

[56] References Cited

U.S. PATENT DOCUMENTS

| | | | |
|---|---|---|---|
| 4,413,289 | 11/1983 | Weaver et al. ............... | 360/8 |
| 5,153,869 | 10/1992 | Yoshimaru et al. ............ | 369/111 |
| 5,245,444 | 9/1993 | Hashimoto ................... | 358/445 |
| 5,276,662 | 1/1994 | Shaver, Jr. et al. ........... | 369/48 |
| 5,337,295 | 8/1994 | Maeda ....................... | 360/32 |
| 5,471,450 | 11/1995 | Yonemitsu et al. ............ | 369/54 |
| 5,473,588 | 12/1995 | Tanaka et al. ............... | 369/47 |

FOREIGN PATENT DOCUMENTS

| | | |
|---|---|---|
| 0 507 476 | 10/1992 | European Pat. Off. . |
| 0 522 853 | 1/1993 | European Pat. Off. . |
| 62-84469 | 4/1987 | Japan ............... G11B 20/12 |

*Primary Examiner*—Paul Loomis
*Assistant Examiner*—Regina Y. Neal
*Attorney, Agent, or Firm*—Frommer Lawrence Haug, LLP.; William S. Frommer; Dennis M. Smid

[57] ABSTRACT

Data (such as digital audio data) is reproduced from a disk medium at a variable data rate and is then converted to a constant data rate by storing the reproduced data in a buffer memory and reading out the stored data at the constant data rate. Overload of the memory is detected and the reproducing head repeats reproduction of such data from the disk medium that has not been stored. When the data is configured in blocks, memory overload can be detected by input and output block counters and a buffer space comparator which compares the input and output block counts to the memory so as to provide an indication of memory overload.

When the disk medium is driven at constant speed, the storage capacity of the disk medium can be increased compared to that of a constant angular velocity with constant read/write data rate system.

14 Claims, 2 Drawing Sheets

METHOD AND APPARATUS FOR BUFFERING VARIABLE-RATE DATA

This application is a continuation of application Ser. No. 08/433,707, filed May 2, 1995 now abandoned.

BACKGROUND OF THE INVENTION

1. Field of the Invention

This invention relates to apparatus for and methods of reproducing data from a disk medium, capable of use in digital audio and similar systems.

2. Description of the Prior Art

Disk storage devices, such as those used for digital audio applications, typically employ one of two data storage techniques, namely constant angular velocity with constant read/write data rate or constant linear velocity with constant read/write data rate.

In the constant angular velocity with constant read/write data rate mode, the disk rotates at a constant rate, regardless of the radial position of the read/write head and the read/write data rate to the disk medium is constant.

One advantage of this mode is that the speed of the disk is independent of the position of the read/write head; thus there is no need to change the rotational speed of the disk when the read/write head changes position. This process of speeding up or slowing down the rotational speed of the disk can take longer than the positioning time of the head, and its avoidance decreases the latency of the disk system.

Another advantage is that, because the speed of the disk is independent of the position of the read/write head, there can be more than one independently positioned read/write head in simultaneous use. This technique can greatly increase the overall data rate of the disk system.

Also, since the data rate of the read/write head is constant, this allows the use of simple equalisers in replay electronics.

However, a disadvantage of this mode relates to the storage capacity of the disk. Referring to FIG. 1 of the accompanying drawings, there is shown a portion of a disk of known outside diameter D and centre C, used to record a signal of data rate B bits per second, where the maximum linear density of bits per unit length is L, where the density of tracks per unit length is T, and where the inside diameter of the recorded area RA is I. The following calculations provide the value of I which yields the maximum storage on the disk.

The length of the inside track is $$\pi I$$

The number of bits recorded on the inside track is $$\pi I L$$

The width of disk available for the recording of data is $$\frac{D-I}{2}$$

The number of tracks recorded is $$T\left(\frac{D-I}{2}\right)$$

Since this is a constant angular velocity and constant data rate method, each track contains the same number of bits equal to $$\pi I L$$

Thus the number of bits which may be recorded on a disk is $$\pi I L T\left(\frac{D-I}{2}\right)$$

This may be rewritten as $$(ID - I^2) * \left(\frac{\pi L T}{2}\right)$$

The second of these two terms contains only set values. Thus the maximum storage capacity corresponds to a maximum value of the first term $$ID - I^2$$

The first differential with respect to I is $$D - 2I$$

Giving a maximum at $$I = \frac{D}{2}$$

Inserting this value into the original equation the number of bits which may be recorded on a disk is $$\pi \frac{D}{2} L T \left(\frac{D - \frac{D}{2}}{2}\right) \tag{1}$$

or $$\pi L T \frac{D^2}{8}$$

In the constant linear velocity with constant read/write data rate mode, the disk rotates at a variable rate, depending upon the radial position of the read/write head and the read/write data rate to the disk medium is constant.

An advantage of this mode resides in the improved disk storage capacity as compared to the above-described constant angular velocity mode. Using the same constants as above and given a value of I, referring again to FIG. 1, the length of the inside track is $$\pi I$$

The number of bits recorded on the inside track is $$\pi IL$$

The length of the outside track is $$\pi D$$

The number of bits recorded on the outside track is $$\pi DL$$

The width of disk available for the recording of data is $$\frac{D-I}{2}$$

The number of tracks recorded is $$T\left(\frac{D-I}{2}\right)$$

Since this is a constant linear velocity and constant data rate method, the "average" track contains the mean number of bits between the number on the inside track and that on the outside track.

Thus the number of bits which may be recorded on the average track is $$\pi L\left(\frac{D+I}{2}\right)$$

Thus the number of bits which may be recorded on the disk is $$T\left(\frac{D-I}{2}\right)*\pi L\left(\frac{D+I}{2}\right)$$

This may be rewritten as $$\pi LT\frac{(D-I)(D+I)}{4}$$

or $$\pi LT\frac{(D^2-I^2)}{4}$$

Smaller values of I obviously lead to greater storage capacity; however zero is not a practical value for the inner radius and for fair comparison a value of D/2 will be used as for the previous case. This leads to a capacity of $$\pi LT\frac{\left(D^2-\frac{D^2}{4}\right)}{4} \quad (2)$$

or $$\pi LTD^2*\frac{3}{16}$$

This is 50% greater than the capacity in the previous case as expressed in equation (1). Moreover, this can be increased still further by selecting a value of the linear diameter I less than D/2.

A disadvantage of this mode is that the speed of the disk varies with the position of the read/write head, the speed variation being proportional to the ratio between the outside and inside diameters, a ratio of 2 to 1 in the above case.

European Patent Application Serial No. 0 507 476 A discloses disk recording and reproducing apparatus in which reproduced data from a disk is supplied to a buffer memory in synchronism with a clock signal having a frequency dependent on the transfer speed of the reproduced data. During recording, the data is supplied to the buffer memory according to a constant frequency clock signal, and is read out of the memory for recording at a variable frequency clock rate.

SUMMARY OF THE INVENTION

It is an object of the invention to provide apparatus and a method for reproducing data from a disk medium in which the disadvantages of the constant angular velocity with constant read/write data rate and the constant linear velocity with constant read/write data rate techniques can be reduced.

It is another object of the invention to provide apparatus and a method for reproducing data from a disk medium at a constant rotational speed and in which more than one read/write head can be provided, thereby increasing the potential data rate of the system.

According to one aspect of the invention there is provided apparatus for reproducing data from a disk medium at a variable data rate and for converting the reproduced data to a constant data rate, the apparatus comprising:

a reproducing head for reproducing the data from the disk medium at the variable data rate;

buffer memory means for storing the reproduced data from the reproducing head and for reading out the stored data at a constant data rate;

means for detecting overload of the buffer memory means; and servo means responsive to the overload detecting means for controlling the reproducing head to repeat reproduction of data from the disk medium when overload of the buffer memory means has been detected.

According to another aspect of the invention there is provided a method of reproducing data from a disk medium at a variable data rate and for converting the reproduced data to a constant data rate, the method comprising:

storing in a buffer memory data reproduced from the disk medium by a reproducing head at a variable data rate;

reading out the stored data from the buffer memory at a constant data rate;

detecting overload of the buffer memory; and controlling the reproducing head to repeat reproduction of data from the disk medium when overload of the buffer memory has been detected.

The disk reproduction technique according to preferred embodiments of the invention effectively combines the advantages of the two previously-proposed methods described above. The technique can be considered to be a constant angular velocity with constant linear density mode, in which the disk rotates at a constant rate, regardless of the radial position of the read/write head, and the density of bits per unit length is also constant.

An advantage of the preferred mode is that the speed of the disk is independent of the position of the read/write head; thus there is no need to change the rotational speed of the disk when the read/write head changes position and there can be more than one independently positioned read/write head in simultaneous use.

Another advantage is that the storage capacity of the disk using constant angular velocity with constant linear density is the same as that using constant linear velocity with constant read/write data rate, namely 50% greater than the capacity of the constant angular velocity with constant read/write data rate system.

However, a consequence of using this technique is that the data rate of the read/write head varies. In real time applications such as the reproduction of stored audio data, this factor must be compensated for by the insertion of a buffer memory between the variable data rate disk and the (assumed constant) digital audio data interface, the read/write head then being used in intermittent (rather than continuous) mode.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
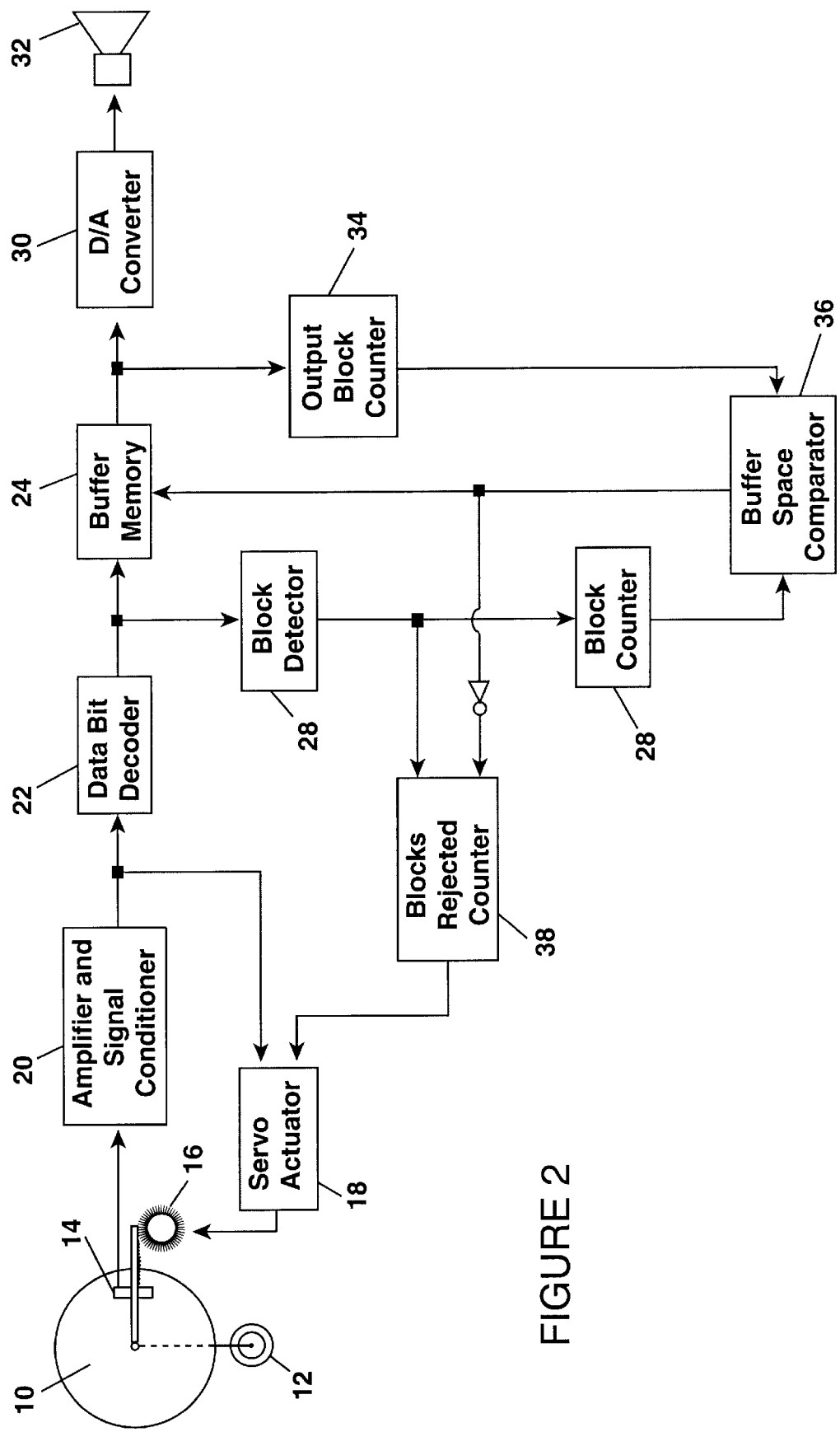
FIG. 2 is a block diagram of a reproduction circuit according to a preferred embodiment of the invention.

FIG. 2 shows a reproduction circuit according to the preferred embodiment of the invention, which makes use of a constant angular velocity with constant linear density technique. The data may have been recorded on the disk in a similar manner to the constant linear velocity with constant read/write data rate mode; in any event, the data storage format will be similar to that on a disk recorded in that mode. However, unlike in that mode, the read data rate is not constant (since the linear density is constant) and so some form of data buffering system or the like is necessary to restore the output data rate so that it effectively becomes a constant rate output.

Referring to FIG. 2, a disk 10, such as an optical disk or the like, is driven by a constant speed motor drive 12, and a replay head 14 can move across the recorded area of the disk 10 by means of a head drive 16 operated by a servo actuator 18. The replay head 14 is provided with the usual focussing and tracking facilities. The reproduced signal from the replay head 14 is supplied to an amplifier and signal conditioner 20 which provides an output signal both to the servo actuator 18 and to a data bit decoder 22.

The output of the data bit decoder 22 is effectively the decoded (and possibly error-corrected) bits as reproduced from the disk 10, at the variable data rate imposed by the constant angular velocity (the data on the disc being at a constant linear density). The variable bit data rate output of the data bit decoder 22 is supplied to a buffer memory 24 and to a block detector 26. The block detector 26 provides a block detection signal to a block counter 28 which counts the number of reproduced data blocks which have been supplied to the buffer memory 24. Since, as can be seen from FIG. 3, the number of bits per revolution increases linearly as the replay head 14 moves towards the outside of the disk 10, in practice this will mean that, increasingly towards the outside of the disk, the data from the data bit decoder 22 will be written into the buffer memory 24 at a faster rate than it is read out. The block counter 28 monitors for near memory overload and, as will be described, causes the servo actuator 18 to move back by one or more tracks.

The buffer memory 24 is arranged to have read out therefrom blocks of data at a constant data rate, and these are supplied via a digital-to-analog converter 30 to an analog audio output 32.

An output block counter 34 counts the number of blocks of data read out (at constant rate) from the buffer memory 24, and this output count is compared with that in the block counter 28 by a buffer space comparator 36 which provides an output signal indicative of whether or not there is any space remaining in the buffer memory 24.

The signal from the buffer space comparator 36 is supplied as a write enable signal to the buffer memory 24 and, in inverted form, to a blocks rejected counter 38 which also receives the output of the block detector 26 and counts the number of blocks which have not been written into the buffer memory 24 by counting the output of the block detector 26 only when the signal from the buffer space comparator 36 indicates that the buffer memory 24 is full and hence there is no write enable to the memory. An output signal from the blocks rejected counter 38 is then supplied to the servo actuator 18 to cause the replay head 14 to skip back one or more tracks as required. In certain circumstances, such as near the outside of the disk 10 when the data rate is high, it may be advantageous for the replay head 14 to skip back more than one track. On the other hand, when the replay head data rate is only slightly higher than the required data output rate, skipping back one track should be sufficient.

It will therefore be seen that, in operation of the circuit shown in FIG. 2, data is reproduced from the disk 10 at a variable bit rate, depending on the position of the replay head 14 (see top curve in FIG. 3) and is written into the buffer memory 24. The data is read out of the buffer memory 24 at a constant data rate and supplied as an output signal, possibly in analog form, of constant data rate. Thus, for example, an audio signal will be reproduced correctly. However, assuming a buffer memory 24 of finite size, in practice the memory would overload since the write bit rate increases as the replay head 14 moves towards the outside of the disk 10. For this reason, the block detector 26 and block counter 28 maintain a check of the number of data blocks supplied to the buffer memory 24, and the output block counter 34 keeps a count of the data blocks read out. As soon as a possible memory overload is detected by the buffer space comparator 36 (that is, if the count in the block counter 28 is about to exceed the count in the output block counter 34 by more than the capacity of the buffer memory 24), write enable to the buffer memory 24 is suppressed and the blocks rejected counter 38 is enabled to start counting the number of blocks on the reproduced signal which are not being written into the buffer memory 24. The replay head 14 is then set to reproduce again the track(s) from which the data has not been written into the buffer memory 24 and, when the comparator 36 indicates that there is once more available space in the buffer memory 24, normal replay operation is resumed and data writing to the memory 24 is again enabled.

Figure 1:
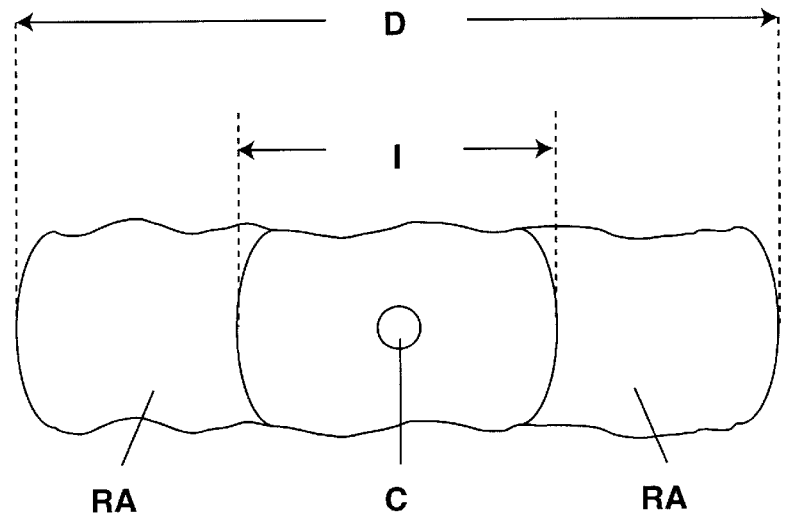
FIG. 1 shows an edge-to-edge portion of a disk carrying recorded data.
Figure 3:
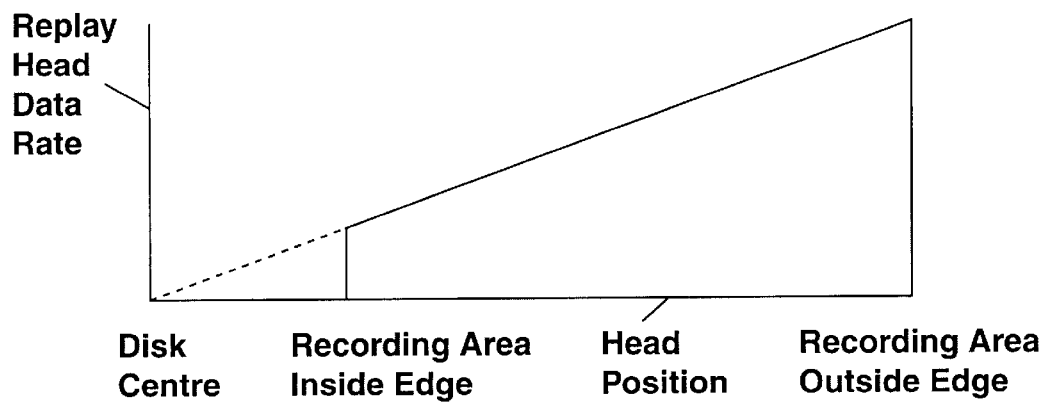
FIG. 3 shows graphically the relationship between reproduced data rate as well as speed of head movement with head position on the disk.
Figure 3:
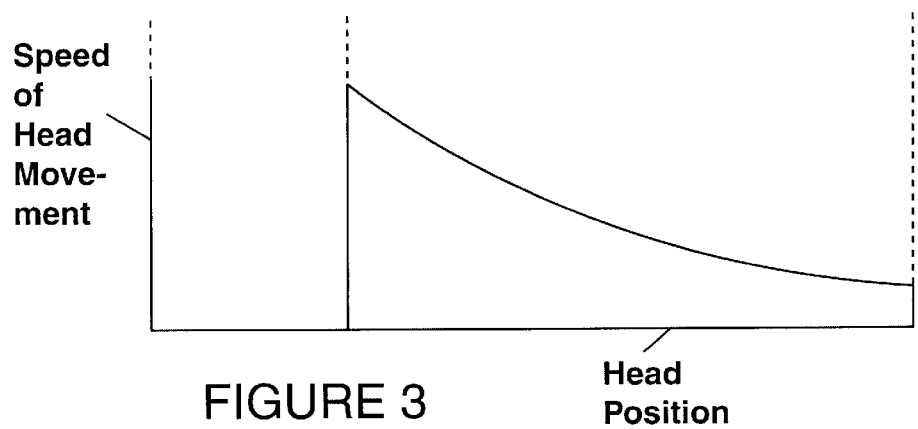

It will be seen from the upper graph of FIG. 3 that the replay data rate is proportional to the distance of the replay head 14 from the disk centre, and also from the lower graph that the average speed (taking into account the head skipping operations) of the replay head decreases towards the outside of the disk.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for reproducing a plurality of data from a disk medium, said disk medium having said plurality of data stored thereupon with a constant linear density, the apparatus comprising:

a reproducing head for reproducing said plurality of data from said disk medium while said disk medium is rotated at a constant rotational speed so that said plurality of data is reproduced at a variable data rate which varies with a radial position of said reproducing head with respect to said disk medium;

buffer memory means for receiving said plurality of data reproduced from said disk medium at only said variable data rate, for storing the same therein, and for reading out a plurality of reproduced data at only a constant data rate such that said buffer memory means has varying amounts of said data stored therein;

overload detecting means for detecting overload of said buffer memory means; and servo means responsive to said overload detecting means for controlling said reproducing head to repeat the reproduction of data previously reproduced but not stored in said buffer memory means from said disk medium for storage in said buffer memory means when overload of said buffer memory means has been detected.

2. Apparatus according to claim 1, wherein said plurality of data reproduced from said disk medium is configured in blocks and wherein said overload detecting means includes an input block counter for counting a number of data blocks supplied to said buffer memory means.

3. Apparatus according to claim 2, wherein said overload detecting means includes an output block counter for counting a number of data blocks read out of said buffer memory means, and count comparing means for comparing said number of data blocks supplied to said buffer memory means with said number of data blocks read out of said buffer memory means and for providing a write enable signal to said buffer memory means when said buffer memory means is not full.

4. Apparatus according to claim 3, wherein said overload detecting means includes means responsive to said write enable signal and to said number of data blocks supplied to said buffer memory means for counting a number of data blocks reproduced from said disk medium by said reproducing head that have not been stored in said buffer memory means and for providing a servo control signal in accordance with the number of data blocks that have not been stored in said buffer memory means.

5. Apparatus according to claim 1, wherein said plurality of data reproduced from said disk medium is configured in blocks and wherein said overload detecting means includes an input block counter for counting a number of data blocks supplied to said buffer memory means.

6. Apparatus according to claim 5, wherein said overload detecting means includes an output block counter for counting a number of data blocks read out of said buffer memory means, and count comparing means for comparing said number of data blocks supplied to said buffer memory means with said number of data blocks read out of said buffer memory means and for providing a write enable signal to said buffer memory means when said buffer memory means is not full.

7. Apparatus according to claim 6, wherein said overload detecting means includes means responsive to said write enable signal and to said number of data blocks supplied to said buffer memory means for counting a number of data blocks reproduced from said disk medium by said reproducing head that have not been stored in said buffer memory means and for providing a servo control signal in accordance with the number of data blocks that have not been stored in said buffer memory means.

8. A method of reproducing a plurality of data from a disk medium, said disk medium having said plurality of data stored thereupon with a constant linear density, the method comprising the steps of:

reproducing with a reproducing head said plurality of data from said disk medium while said disk medium is rotated at a constant rotational speed so that said plurality of data is reproduced at a variable data rate which varies with a radial position of said reproducing head with respect to said disk medium;

receiving in a buffer memory said plurality of data reproduced from said disk medium at only said variable data rate, storing the same in said buffer memory, and reading out a plurality of reproduced data from said buffer memory at only a constant data rate such that said buffer memory has varying amounts of said data stored therein;

detecting overload of said buffer memory; and controlling said reproducing head to repeat reproduction of data previously reproduced but not stored in said buffer memory means from said disk medium for storage in said buffer memory means when overload of said buffer memory has been detected.

9. A method according to claim 8, wherein said plurality of data reproduced from said disk medium is configured in blocks and wherein said step of detecting includes counting a number of data blocks supplied to said buffer memory.

10. A method according to claim 9, further comprising the steps of counting a number of data blocks read out of said buffer memory, comparing said number of data blocks supplied to said buffer memory with said number of data blocks read out of said buffer memory, and enabling writing to said buffer memory when a result of said step of comparing indicates that said buffer memory is not full.

11. A method according to claim 10, further comprising the steps of counting a number of data blocks reproduced from said disk medium by said reproducing head that have not been stored in said buffer memory as a function of said result and of said number of data blocks supplied to said buffer memory, and providing a servo control signal according to the number of data blocks that have not been stored in said buffer memory.

12. A method according to claim 8, wherein said plurality of data reproduced from said disk medium is configured in blocks and wherein said step of detecting includes counting a number of data blocks supplied to said buffer memory.

13. A method according to claim 12, further comprising the steps of counting a number of data blocks read out of said buffer memory, comparing said number of data blocks supplied to said buffer memory with said number of data blocks read out of said buffer memory, and enabling writing to said buffer memory when a result of said step of comparing indicates that said buffer memory is not full.

14. A method according to claim 13, further comprising the steps of counting a number of data blocks reproduced from said disk medium by said reproducing head that have not been stored in said buffer memory as a function of said result and of said number of data blocks supplied to said buffer memory, and providing a servo control signal according to the number of data blocks that have not been stored in said buffer memory.

* * * * *